US012785085B2

(12) United States Patent
Hashimoto et al.

(10) Patent No.: US 12,785,085 B2
(45) Date of Patent: Nov. 3, 2026

(54) ELECTRODE, ALL-SOLID-STATE BATTERY, AND METHOD OF PRODUCING ELECTRODE

(71) Applicants: TOYOTA JIDOSHA KABUSHIKI KAISHA, Toyota (JP); Panasonic Holdings Corporation, Kadoma (JP)

(72) Inventors: Kazuya Hashimoto, Miyoshi (JP); Hiroki Yabe, Hirakata (JP); Izuru Sasaki, Kyoto (JP); Hiroki Kamitake, Osaka (JP); Yuta Sugimoto, Nishinomiya (JP)

(73) Assignees: TOYOTA JIDOSHA KABUSHIKI KAISHA, Toyota (JP); Panasonic Holdings Corporation, Kadoma (JP)

( * ) Notice: Subject to any disclaimer, the term of this patent is extended or adjusted under 35 U.S.C. 154(b) by 677 days.

(21) Appl. No.: 18/343,878

(22) Filed: Jun. 29, 2023

(65) Prior Publication Data

US 2024/0047656 A1 Feb. 8, 2024

(30) Foreign Application Priority Data

Jul. 27, 2022 (JP) ................................. 2022-119622

(51) Int. Cl.
*H01M 4/36* (2006.01)
*H01M 4/1391* (2010.01)
(Continued)

(52) U.S. Cl.
CPC ......... *H01M 4/366* (2013.01); *H01M 4/1391* (2013.01); *H01M 4/525* (2013.01);
(Continued)

(58) Field of Classification Search
CPC .... H01M 4/366; H01M 4/1391; H01M 4/525; H01M 4/13; H01M 4/139; H01M 4/62;
(Continued)

(56) References Cited

U.S. PATENT DOCUMENTS

| | | | |
|---|---|---|---|
| 2015/0372344 A1 | 12/2015 | Iwasaki et al. |
| 2017/0250407 A1 | 8/2017 | Iwasaki |
| 2022/0416296 A1 | 12/2022 | Nakama et al. |

FOREIGN PATENT DOCUMENTS

| | | |
|---|---|---|
| JP | 2014-154406 A | 8/2014 |
| JP | 2014-154407 A | 8/2014 |

(Continued)

OTHER PUBLICATIONS

U.S. Appl. No. 17/976,456, filed Oct. 28, 2022.

*Primary Examiner* — Barbara L Gilliam
*Assistant Examiner* — Andrew Kim
(74) *Attorney, Agent, or Firm* — Sughrue Mion, PLLC

(57) ABSTRACT

An electrode includes an active material layer. The active material layer includes a composite particle and an imidazoline-based compound. The composite particle includes a core particle and a covering layer. The covering layer covers at least part of a surface of the core particle. The core particle includes an active material. The covering layer includes a first layer and a second layer. At least part of the first layer is interposed between the core particle and the second layer. The first layer includes a first solid electrolyte. The second layer includes a second solid electrolyte. The first solid electrolyte is a fluoride. The second solid electrolyte is a sulfide.

10 Claims, 2 Drawing Sheets

(51) Int. Cl.
*H01M 4/525* (2010.01)
*H01M 10/0562* (2010.01)

(52) U.S. Cl.
CPC .................. *H01M 10/0562* (2013.01); *H01M 2300/0071* (2013.01); *H01M 2300/0094* (2013.01)

(58) Field of Classification Search
CPC .. H01M 4/624; H01M 4/625; H01M 10/0562; H01M 10/0525; H01M 10/052; H01M 2300/0071; H01M 2300/0094; H01M 2300/0068; Y02E 60/10
See application file for complete search history.

(56) References Cited

FOREIGN PATENT DOCUMENTS

| | | | |
|---|---|---|---|
| JP | 2017-152347 | A | 8/2017 |
| JP | 2020-161364 | A | 10/2020 |
| JP | 2021-193647 | A | 12/2021 |
| WO | 2021/187391 | A1 | 9/2021 |

ELECTRODE, ALL-SOLID-STATE BATTERY, AND METHOD OF PRODUCING ELECTRODE

CROSS REFERENCE TO RELATED APPLICATIONS

This nonprovisional application is based on Japanese Patent Application No. 2022-119622 filed on Jul. 27, 2022, with the Japan Patent Office, the entire contents of which are hereby incorporated by reference.

BACKGROUND

Field

The present disclosure relates to an electrode, an all-solid-state battery, and a method of producing an electrode.

Description of the Background Art

Japanese Patent Laying-Open No. 2014-154407 discloses a composite active material, where the composite active material comprises a composite particle containing an oxide solid electrolyte covering an active material as well as a sulfide solid electrolyte covering the composite particle.

SUMMARY

Hereinafter, solid electrolyte may be abbreviated as "SE". For example, sulfide solid electrolyte may be abbreviated as "sulfide SE".

Sulfide SE has high ion-conductive properties and excellent formability. Sulfide SE is suitable for bulk-type all-solid-state batteries. However, when sulfide SE comes into direct contact with active material inside the electrode, degradation of sulfide SE may be facilitated. Degradation of sulfide SE can impair ion-conductive properties, for example.

In order to reduce direct contact between sulfide SE and active material, it is suggested to cover the active material with oxide SE to form composite particles. Further, in order to facilitate interface formation between the composite particles and sulfide SE, it is suggested to cover the composite particles with sulfide SE. Forming a composite of active material, oxide SE, and sulfide SE is expected to decrease initial resistance. However, there is room for improvement in post-endurance resistance increment.

An object of the present disclosure is to decrease post-endurance resistance increment.

Hereinafter, the technical configuration and effects of the present disclosure will be described. It should be noted that the action mechanism according to the present specification includes presumption. The action mechanism does not limit the technical scope of the present disclosure.

1. An electrode includes an active material layer. The active material layer includes a composite particle and an imidazoline-based compound. The composite particle includes a core particle and a covering layer. The covering layer covers at least part of a surface of the core particle. The core particle includes an active material. The covering layer includes a first layer and a second layer. At least part of the first layer is interposed between the core particle and the second layer. The first layer includes a first solid electrolyte. The second layer includes a second solid electrolyte. The first solid electrolyte is a fluoride. The second solid electrolyte is a sulfide.

As charge and discharge proceed, active material expands and shrinks. In an active material layer, around the active material, an ion conduction path and an electron conduction path are formed. An ion conduction path may be formed by an ion-conducting material such as sulfide SE, for example; and an electron conduction path may be formed by an electron-conducting material such as carbon black, for example. The ion conduction path and the electron conduction path can follow the volume change of the active material, to some extent.

When the active material forms aggregates in the active material layer, a significant volume change can occur locally. The ion conduction path and the electron conduction path may not be capable of following the significant volume change, and thereby resistance increase may be facilitated.

The active material layer according to the present disclosure comprises a composite particle and an imidazoline-based compound. During the formation of the active material layer, the imidazoline-based compound may act as a dispersant for constituent materials of the active material layer. According to a novel finding of the present disclosure, the imidazoline-based compound may give good dispersibility especially to sulfide SE.

The composite particle is covered with the covering layer. The covering layer includes a sulfide SE. The imidazoline-based compound may give good dispersibility to the composite particle. As the composite particle (active material) is dispersed well, the volume change may be delocalized. Therefore, ion conduction paths and electron conduction paths are likely to be maintained, and thereby resistance increment may be decreased.

Further, the composite particle according to the present disclosure also includes a fluoride SE. In a conventional composite particle, oxide SE (such as $LiNbO_3$, for example) is present between active material and sulfide SE. According to a novel finding of the present disclosure, reaction resistance of fluoride SE is less likely to increase during endurance, as compared to oxide SE. When fluoride SE (first layer) is present between the active material (core particle) and the sulfide SE (second layer) in the composite particle, resistance increment is expected to be further decreased.

2. In the electrode according to "1" above, the imidazoline-based compound may be represented by the following formula (1), for example:

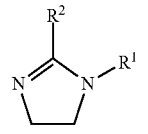
(1)

where $R^1$ is an alkyl group or a hydroxyalkyl group and has 1 to 22 carbon atoms, and $R^2$ is an alkyl group or an alkenyl group and has 10 to 22 carbon atoms.

3. In the electrode according to "1" or "2" above, the imidazoline-based compound may be from 0.05 to 0.1 parts by mass relative to 100 parts by mass of the composite particle.

4. In the electrode according to any one of "1" to "3" above, the first solid electrolyte may be represented by the following formula (2), for example:

$$Li_{6-nx}M_xF_6 \quad (2)$$

where x satisfies 0<x<2, M is at least one selected from the group consisting of semimetal atoms and metal atoms except Li, and n represents an oxidation number of M.

5. M in the above formula (2) may include an atom whose oxidation number is +4.

6. M in the above formula (2) may include an atom whose oxidation number is +3.

7. M in the above formula (2) may include at least one selected from the group consisting of Ca, Mg, Al, Y, Ti, and Zr.

8. An all-solid-state battery comprises the electrode according to any one of “1” to “7” above.

The all-solid-state battery is expected to have low resistance increment at the time of endurance.

9. A method of producing an electrode comprises the following (a) and (b):

(a) preparing a slurry that includes a composite particle, an imidazoline-based compound, and a dispersion medium; and (b) forming an active material layer by application of the slurry.

The composite particle includes a core particle and a covering layer. The covering layer covers at least part of a surface of the core particle. The core particle includes an active material. The covering layer includes a first layer and a second layer. At least part of the first layer is interposed between the core particle and the second layer. The first layer includes a first solid electrolyte. The second layer includes a second solid electrolyte. The first solid electrolyte is a fluoride. The second solid electrolyte is a sulfide.

The imidazoline-based compound may give good dispersibility to the composite particle in the slurry. This makes the composite particle less likely to form aggregates, and, as a result, an active material layer in which the composite particle is dispersed well may be formed.

10. The (a) above may include the following (a1) and (a2), for example:

(a1) preparing a first slurry that includes the imidazoline-based compound and the dispersion medium; and (a2) preparing a second slurry by dispersing the composite particle into the first slurry.

With the composite particle added to the slurry after the addition of the imidazoline-based compound, dispersibility of the composite particle is expected to be further enhanced.

Next, an embodiment of the present disclosure (which may also be simply called “the present embodiment” hereinafter) and an example of the present disclosure (which may also be simply called “the present example” hereinafter) will be described. It should be noted that neither the present embodiment nor the present example limits the technical scope of the present disclosure. The present embodiment and the present example are illustrative in any respect. The present embodiment and the present example are non-restrictive. The technical scope of the present disclosure encompasses any modifications within the meaning and the scope equivalent to the terms of the claims. For example, it is originally planned that certain configurations of the present embodiment and the present example can be optionally combined.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

<Terms and Definitions Thereof, Etc.>

Figure 1:
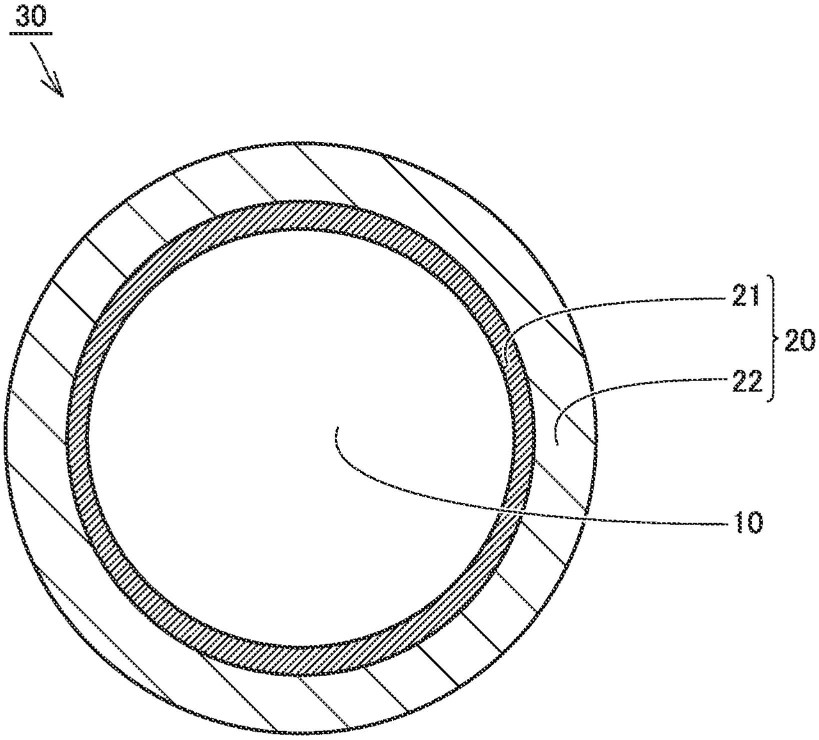
FIG. 1 is a conceptual view of an example of a composite particle according to the present embodiment.

Expressions such as “comprise”, “include”, and “have”, and other similar expressions (such as “be composed of”, for example) are open-ended expressions. In an open-ended expression, in addition to an essential component, an additional component may or may not be further included. The expression “consist of” is a closed-end expression. However, even when a closed-end expression is used, impurities present under ordinary circumstances as well as an additional element irrelevant to the technique according to the present disclosure are not excluded. The expression “consist essentially of” is a semiclosed-end expression. A semiclosed-end expression tolerates addition of an element that does not substantially affect the fundamental, novel features of the technique according to the present disclosure.

“At least one of A and B” includes “A or B” and “A and B”. “At least one of A and B” may also be expressed as “A and/or B”.

Expressions such as “may” and “can” are not intended to mean “must” (obligation) but rather mean “there is a possibility” (tolerance).

Regarding a plurality of steps, operations, processes, and the like that are included in various methods, the order for implementing those things is not limited to the described order, unless otherwise specified. For example, a plurality of steps may proceed simultaneously. For example, a plurality of steps may be implemented in reverse order.

A singular form also includes its plural meaning, unless otherwise specified. For example, “a particle” may mean not only “one particle” but also “a group of particles (powder, particles)”.

A numerical range such as “from m to n %” includes both the upper limit and the lower limit. That is, “from m to n %” means a numerical range of “not less than m % and not more than n %”. Moreover, “not less than m % and not more than n %” includes “more than m % and less than n %”. Further, any numerical value selected from a certain numerical range may be used as a new upper limit or a new lower limit. For example, any numerical value from a certain numerical range may be combined with any numerical value described in another location of the present specification or in a table or a drawing to set a new numerical range.

All the numerical values are regarded as being modified by the term “about”. The term “about” may mean ±5%, ±3%, ±1%, and/or the like, for example. Each numerical value may be an approximate value that can vary depending on the implementation configuration of the technique according to the present disclosure. Each numerical value may be expressed in significant figures. Each measured value may be the average value obtained from multiple measurements performed. The number of measurements may be 3 or more, or may be 5 or more, or may be 10 or more. Generally, the greater the number of measurements is, the more reliable the average value is expected to be. Each measured value may be rounded off based on the number of the significant figures. Each measured value may include an error occurring due to an identification limit of the measurement apparatus, for example.

When a compound is represented by a stoichiometric composition formula (such as "$LiCoO_2$", for example), this stoichiometric composition formula is merely a typical example of the compound. The compound may have a non-stoichiometric composition. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution may also be tolerated.

"Semimetal" includes B, Si, Ge, As, Sb, and Te. "Metal" refers to an element belonging to Group 1 to Group 16 of the periodic table except "H, B, Si, Ge, As, Sb, Te, C, N, P, O, S, and Se". When an inorganic compound includes at least one of a semimetal and a metal as well as F, the semimetal and/or the metal may have a positive (+) oxidation number.

"Electrode" collectively refers to a positive electrode and a negative electrode. An electrode may be either a positive electrode or a negative electrode.

"Thickness" of a covering layer, a first layer, and a second layer may be measured by the procedure described below. A composite particle is embedded into a resin material to prepare a sample. With the use of an ion milling apparatus, a cross section of the sample is exposed. For example, "Arblade (registered trademark) 5000" (trade name) manufactured by Hitachi High-Technologies (or a similar product) may be used. The cross section of the sample is examined by an SEM (Scanning Electron Microscope). For example, "SU8030" (trade name) manufactured by Hitachi High-Technologies (or a similar product) may be used. For each of ten composite particles, the thickness of the part in question (the covering layer, the first layer, the second layer) is measured in twenty fields of view. The arithmetic mean of a total of 200 thickness measurements is regarded as the thickness of the part.

The thickness of each layer may be measured in an elemental mapping image captured by SEM-EDX (Energy Dispersive X-ray Spectrometry). In an elemental mapping image, an element is selected from each component, to represent the component. For example, Ni may be selected as a representative element for the core particle (active material); F may be selected as a representative element for the first layer (fluoride SE); and S may be selected as a representative element for the second layer (sulfide SE).

"Covering rate" is measured by the procedure described below. In the same manner as for the coating layer thickness measurement sample, a composite particle cross-sectional sample is prepared. In a cross-sectional SEM image, the length of the contour of the core particle (active material) is measured (Lo). The length of the portion of the contour of the core particle that is covered by at least one of fluoride SE and sulfide SE is measured (Li). Li is divided by Lo, and the percentage of the resulting value is the covering rate. The covering rate is measured for each of twenty composite particles. The arithmetic mean of the twenty covering rates is regarded as "the covering rate".

For example, Lo and Li may be calculated by image processing of an SEM-EDX elemental mapping image.

"Hollow particle" refers to a particle that has a central cavity whose area occupies 30% or more of the entire cross-sectional area of the particle in a cross-sectional image (such as a cross-sectional SEM image, for example) of the particle. "Solid particle" refers to a particle that has a central cavity whose area occupies less than 30% of the entire cross-sectional area of the particle in a cross-sectional image of the particle.

"D50" refers to a particle size in volume-based particle size distribution at which cumulative frequency of particle sizes accumulated from the small size side reaches 50%. D50 may be measured with a laser-diffraction particle size distribution analyzer.

"Average Feret diameter" is measured in a two-dimensional image (such as an SEM image, for example) of particles. The arithmetic mean of maximum Feret diameters of twenty or more particles is "the average Feret diameter".

"Solid content" refers to the ratio of the total mass of all the components except dispersion medium, to the mass of the entire slurry. The solid content is expressed in percentage.

<Electrode>

An electrode includes an active material layer. The electrode may further include a base material and/or the like, for example. On the surface of the base material, an active material layer may be placed, for example. The base material may be in sheet form, for example. The base material may be electron-conductive, for example. The base material may function as a current collector, for example. The base material may include a metal foil and/or the like, for example. The metal foil may include at least one selected from the group consisting of Al, Cu, Ni, Fe, and Ti, for example. The metal foil may be an Al foil, an Al alloy foil, a Ni foil, a Cu foil, a Cu alloy foil, a stainless steel foil, or the like, for example. When the electrode is a positive electrode, the base material may include an Al foil and/or the like, for example. When the electrode is a negative electrode, the base material may include a Ni foil, a Cu foil, and/or the like, for example. The base material may have a thickness from 5 to 50 μm, for example.

The active material layer may have a thickness from 1 to 1000 μm, or 10 to 500 μm, for example. The active material layer includes a composite particle and an imidazoline-based compound. The active material layer may further include an auxiliary material. The auxiliary material may include, for example, at least one selected from the group consisting of an ion-conducting material, an electron-conducting material, and a binder. For example, the active material layer may consist of the auxiliary material in an amount from 1 to 50% and the imidazoline-based compound in an amount from 0.01 to 0.3% in terms of mass fraction, with the remainder being made up of the composite particle.

<<Imidazoline-Based Compound>>

The active material layer includes the imidazoline-based compound. The imidazoline-based compound may act as a dispersant. The imidazoline-based compound may give good dispersibility especially to sulfide SE. Due to the presence of the imidazoline-based compound, the composite particle may be dispersed well. As a result of the composite particle (active material) dispersed well, resistance increment during endurance may be decreased.

The imidazoline-based compound has an imidazoline framework. The imidazoline framework includes a nitrogen-containing heterocyclic structure. The imidazoline framework may be induced from imidazole. For example, the imidazoline-based compound may be represented by the following formula (1):

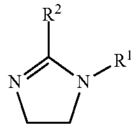

(1)

In the above formula (1), $R^1$ may be an alkyl group or a hydroxyalkyl group, for example. $R^1$ may have 1 to 22 carbon atoms, for example. In the hydroxyalkyl group, a hydroxyl group may be bonded to a terminal carbon atom that is located opposite to the carbon atom bonded to N (nitrogen atom), for example.

In the above formula (1), $R^2$ may be an alkyl group or an alkenyl group, for example. $R^2$ may have 10 to 22 carbon atoms, for example. In the alkenyl group, the position and the number of double bonding are not particularly limited.

The imidazoline-based compound may include 1-hydroxyethyl-2-alkenylimidazoline and/or the like, for example. The active material layer may include one type of imidazoline-based compound, or may include two or more types of imidazoline-based compound.

The amount of the imidazoline-based compound to be used is not particularly limited. For example, the imidazoline-based compound may be from 0.01 to 0.3 parts by mass, or may be from 0.01 to 0.2 parts by mass, or may be from 0.05 to 0.1 parts by mass, relative to 100 parts by mass of the composite particle. When the amount of the imidazoline-based compound to be used is 0.05 parts by mass or more, resistance increment is expected to be decreased, for example. When the amount of the imidazoline-based compound to be used is 0.1 parts by mass or less, initial resistance is expected to be decreased, for example.

<<Composite Particle>>

The active material layer includes a composite particle. The composite particle includes an active material, a fluoride SE, and a sulfide SE. The sulfide SE forms part of the covering layer. The imidazoline-based compound may act on the covering layer to give good dispersibility to the composite particle. When the composite particle is dispersed well in the active material layer, resistance increment during endurance is expected to be decreased.

FIG. 1 is a conceptual view of an example of a composite particle according to the present embodiment.

A composite particle 30 includes a core particle 10 and a covering layer 20. Composite particle 30 has a D50 from 1 to 30 μm, or from 2 to 20 μm, or from 3 to 15 μm, or from 3 to 6 μm, or from 4 to 5 μm, for example. Composite particle 30 may have any shape. Composite particle 30 may be spherical, elliptical, flakes, fibrous, or the like, for example.

Composite particle 30 may be formed by any method. For example, the composite particle may be formed by a mechanochemical method. For example, a particle composing machine may be used to carry out two-step covering treatment. More specifically, into a particle composing machine, core particle 10, the fluoride SE, and the sulfide SE may be added sequentially and mixed, to form covering layer 20. Examples of the particle composing machine include "Nobilta NOB-MINI" manufactured by Hosokawa Micron Corporation. However, as long as it is capable of composing particles, any mixing apparatus, any granulating apparatus, and/or the like may be used.

<<Covering Layer>>

Covering layer 20 covers at least part of the surface of core particle 10. For example, covering layer 20 may be formed in such a manner that it can even up the surface irregularities of core particle 10. Covering layer 20 may cover the entire surface of core particle 10. Covering layer 20 may cover part of the surface of core particle 10. Covering layer 20 may be distributed on the surface of core particle 10, in the form of islands. The covering rate may be from 50 to 100%, or from 60 to 100%, or from 70 to 100%, or from 80 to 100%, or from 90 to 100%, for example. The higher the covering rate is, the more decreased the initial resistance is expected to be, for example.

Covering layer 20 may have a thickness from 6 to 300 nm or from 11 to 150 nm, for example. The thinner the covering layer 20 is, the more decreased the initial resistance is expected to be, for example.

Covering layer 20 includes a first layer 21 and a second layer 22. At least part of first layer 21 is interposed between core particle 10 and second layer 22. For example, first layer 21 may directly cover the surface of core particle 10. For example, second layer 22 may cover the entire first layer 21. Second layer 22 may cover part of first layer 21. First layer 21 may be partially exposed from second layer 22. Second layer 22 may be partially in direct contact with core particle 10.

(First Layer, Fluoride SE)

First layer 21 is, in other words, "a lower layer". First layer 21 may completely cover the entire core particle 10, for example. First layer 21 may have a thickness from 1 to 100 nm or from 1 to 50 nm, for example. The thinner the first layer 21 is, the more decreased the initial resistance is expected to be, for example.

First layer 21 includes a first solid electrolyte (first SE). The first SE is a fluoride. There is a tendency that the reaction resistance of fluoride SE is less likely to increase during endurance.

The composition of the first SE is not particularly limited as long as it includes F. For example, the first SE may include Li and F. For example, the first SE may be represented by the following formula (2):

$$Li_{6-nx}M_xF_6 \quad (2)$$

In the above formula (2), x satisfies $0<x<2$. M is at least one selected from the group consisting of semimetal atoms and metal atoms except Li. n represents an oxidation number of M.

M may consist of a single atom, or may consist of a plurality of types of atoms. When M consists of a plurality of types of atoms, n refers to the weighted average of the oxidation numbers of the atoms. For example, when M includes Ti (oxidation number=+4) and Al (oxidation number=+3) with the molar ratio between Ti and Al being "Ti/Al=3/7" and also x=1 is satisfied, the numerical expression "n=0.3×4+0.7×3" gives n=3.3.

x may satisfy $0.1\leq x\leq 1.9$, $0.2\leq x\leq 1.8$, $0.3\leq x\leq 1.7$, $0.4\leq x\leq 1.6$, $0.5\leq x\leq 1.5$, $0.6\leq x\leq 1.4$, $0.7\leq x\leq 1.3$, $0.8\leq x\leq 1.2$, or $0.9\leq x\leq 11$, for example.

For example, M may include an atom whose oxidation number is +4. For example, M may include an atom whose oxidation number is +3. For example, M may include both an atom whose oxidation number is +4 and an atom whose oxidation number is +3.

For example, M may include at least one selected from the group consisting of Ca, Mg, Al, Y, Ti, and Zr. For example, M may include at least one selected from the group consisting of Al, Y, and Ti. For example, M may include at least one selected from the group consisting of Al and Ti.

For example, the first SE may be represented by the following formula (3):

$$Li_{3-x}Ti_xAl_{1-x}F_6 \quad (3)$$

where x may satisfy $0 \le x \le 1$, $0.1 \le x \le 0.9$, $0.2 \le x \le 0.8$, $0.3 \le x \le 0.7$, or $0.4 \le x \le 0.6$, for example.

The first SE may be in particle form, for example. That is, first layer 21 may be a particle layer, for example. The particle layer is a group of particles. The average Feret diameter of the first SE may be from 0.1 to 1 fold the thickness of first layer 21, for example.

(Second Layer, Sulfide SE)

Second layer 22 is, in other words, "an upper layer". Second layer 22 may constitute the outermost layer of composite particle 30. Second layer 22 may surround core particle 10 without leaving any gap. Second layer 22 may be thicker than first layer 21, for example. Second layer 22 may have a thickness from 5 to 200 nm or from 10 to 100 nm, for example.

Second layer 22 includes a second solid electrolyte (second SE). The second SE is a sulfide. The sulfide SE may exhibit high ion-conductive properties. The composition of the second SE is not particularly limited as long as it includes S (sulfur). The second SE may include Li, P, and S, for example. The second SE may further include O, Ge, Si, and/or the like, for example. The second SE may further include a halogen and/or the like, for example. The second SE may further include I, Br, and/or the like, for example. The second SE may be of glass ceramic type or may be of argyrodite type, for example. The second SE may include, for example, at least one selected from the group consisting of $LiI—LiBr—Li_3PS_4$, $Li_2S—SiS_2$, $LiI—Li_2S—SiS_2$, $LiI—Li_2S—P_2S_5$, $LiI—Li_2O—Li_2S—P_2S_5$, $LiI—Li_2S—P_2O_5$, $LiI—Li_3PO_4—P_2S_5$, $Li_2S—GeS_2—P_2S_5$, $Li_2S—P_2S_5$, $Li_4P_2S_6$, $Li_7P_3S_{11}$, and $Li_3PS_4$.

For example, "$LiI—LiBr—Li_3PS_4$" refers to a sulfide SE produced by mixing LiI, LiBr, and $Li_3PS_4$ in any molar ratio. For example, the second SE may be produced by a mechanochemical method. "$Li_2S—P_2S_5$" includes $Li_3PS_4$. $Li_3PS_4$ may be produced by mixing $Li_2S$ and $P_2S_5$ in "$Li_2S/P_2S_5$=75/25 (molar ratio)", for example. The molar ratio may be specified with a number placed in front of LiI and/or the like. For example, "$10LiI-15LiBr-75Li_3PS_4$" refers to a mixing ratio of "$LiI/LiBr/Li_3PS_4$=10/15/75 (molar ratio)".

The second SE may be in particle form, for example. That is, second layer 22 may be a particle layer, for example. The particle layer is a group of particles. The average Feret diameter of the second SE may be equal to or less than the thickness of second layer 22. The average Feret diameter of the second SE may be equal to, or less than, one third of the maximum Feret diameter of core particle 10. With the size of the second SE sufficiently smaller than the size of core particle 10, there is a tendency that the covering layer 20 is likely to even up the surface irregularities of core particle 10. As a result, the covering rate is expected to be enhanced, for example. The average Feret diameter of the second SE may be from 5 to 200 nm or from 10 to 100 nm, for example.

<<Core Particle>>

Core particle 10 is a base material of composite particle 30. Composite particle 30 may include a single core particle 10. Composite particle 30 may include a plurality of core particles 10. For example, core particle 10 may be a secondary particle. The secondary particle is a group of primary particles. The secondary particle may have a D50 from 1 to 30 μm, or from 2 to 20 μm, or from 3 to 15 μm, or from 3 to 6 μm, or from 4 to 5 μm, for example. The primary particle may have an average Feret diameter from 0.01 to 3 μm, for example.

Core particle 10 may have any shape. Core particle 10 may be spherical, elliptical, flakes, fibrous, or the like, for example. Core particle 10 may be solid particles, or may be hollow particles.

Core particle 10 includes an active material. The active material may cause electrode reaction. Core particle 10 may include a positive electrode active material, for example. That is, the electrode may be a positive electrode. The positive electrode active material may include any component. The positive electrode active material may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, $Li(NiCoMnAl)O_2$, and $LiFePO_4$. "(NiCoMn)" in "$Li(NiCoMn)O_2$", for example, means that the constituents within the parentheses are collectively regarded as a single unit in the entire composition ratio. As long as (NiCoMn) is collectively regarded as a single unit in the entire composition ratio, the amounts of individual constituents are not particularly limited. $Li(NiCoMn)O_2$ may include, for example, at least one selected from the group consisting of $LiNi_{1/3}Co_{1/3}Mn_{1/3}O_2$, $LiNi_{0.4}Co_{0.3}Mn_{0.3}O_2$, $LiNi_{0.5}Co_{0.2}Mn_{0.3}O_2$, $LiNi_{0.5}Co_{0.3}Mn_{0.2}O_2$, $LiNi_{0.5}Co_{0.4}Mn_{0.1}O_2$, $LiNi_{0.5}Co_{0.1}Mn_{0.4}O_2$, $LiNi_{0.6}Co_{0.2}Mn_{0.2}O_2$, $LiNi_{0.6}Co_{0.3}Mn_{0.102}$, $LiNi_{0.6}Co_{0.1}Mn_{0.302}$, $LiNi_{0.7}Co_{0.1}Mn_{0.2}O_2$, $LiNi_{0.7}Co_{0.2}Mn_{0.1}O_2$, $LiNi_{0.8}Co_{0.1}Mn_{0.1}O_2$, and $LiNi_{0.9}Co_{0.05}Mn_{0.05}O_2$. For example, $Li(NiCoAl)O_2$ may include $LiNi_{0.8}Co_{0.5}Al_{0.05}O_2$ and/or the like.

For example, the positive electrode active material may be represented by the following formula (4):

$$Li_{1-y}Ni_xM_{1-x}O_2 \quad (4)$$

$0.5 \le x \le 1$ $-0.5 \le y \le 0.5$

In the above formula (4), M may include at least one selected from the group consisting of Co, Mn, and Al, for example. x may be 0.6 or more, or may be 0.7 or more, or may be 0.8 or more, or may be 0.9 or more, for example.

The positive electrode active material may include an additive, for example. The additive may be a substituted solid solution atom or an intruding solid solution atom, for example. The additive may be an adherent adhered to the surface of the positive electrode active material (primary particle). The adherent may be an elementary substance, an oxide, a carbide, a nitride, a halide, and/or the like, for example. The amount to be added may be from 0.01 to 0.1, or from 0.02 to 0.08, or from 0.04 to 0.06, for example. The amount to be added refers to the ratio of the amount of substance of the additive to the amount of substance of the positive electrode active material. The additive may include, for example, at least one selected from the group consisting of B, C, N, halogens, Sc, Ti, V, Cu, Zn, Ga, Ge, Se, Sr, Y, Zr, Nb, Mo, In, Sn, W, and lanthanoids.

Core particle 10 may include a negative electrode active material, for example. That is, the electrode may be a negative electrode. The negative electrode active material may include any component. The negative electrode active material may include, for example, at least one selected from the group consisting of natural graphite, artificial graphite, soft carbon, hard carbon, Si, $SiO_x$ ($0<x<2$), Si-based alloy, Sn, $SnO_x$ ($0<x<2$), Li, Li-based alloy, and $Li_4Ti_5O_{12}$. $SiO_x$ ($0<x<2$) may be doped with Mg and/or the like, for example. By having an alloy-based active material (such as Si, for example) supported by a carbon-based active material (such as graphite, for example), a composite material may be formed.

<<Ion-Conducting Material>>

The active material layer may include an ion-conducting material, for example. The ion-conducting material may form an ion conduction path in the active material layer. The ion-conducting material may be in particle form. The ion-conducting material may have a D50 from 0.01 to 1 μm, or from 0.01 to 0.95 μm, or from 0.1 to 0.9 μm, for example. The amount of the ion-conducting material to be used is not particularly limited. The amount of the ion-conducting material to be used may be, for example, from 1 to 200 parts by volume, or may be from 50 to 150 parts by volume, or may be from 50 to 100 parts by volume, relative to 100 parts by volume of the composite particle. The ion-conducting material may include a sulfide SE, a fluoride SE, and/or the like, for example. The sulfide SE and the fluoride SE included in the ion-conducting material may be the same type of, or different types of, the sulfide SE and the fluoride SE, respectively, included in the composite particle.

<<Electron-Conducting Material>>

The active material layer may include an electron-conducting material, for example. The electron-conducting material may form an electron conduction path in the active material layer. The amount of the electron-conducting material to be used is not particularly limited. The amount of the electron-conducting material to be used may be, for example, from 0.1 to 10 parts by mass relative to 100 parts by mass of the composite particle. The electron-conducting material may include any component. The electron-conducting material may include, for example, at least one selected from the group consisting of carbon black (CB), vapor grown carbon fiber (VGCF), carbon nanotube (CNT), and graphene flake (GF). The CB may include, for example, at least one selected from the group consisting of acetylene black (AB), Ketjenblack (registered trademark), and furnace black.

<<Binder>>

The binder is capable of binding solids to each other. The amount of the binder to be used is not particularly limited. The amount of the binder to be used may be, for example, from 0.1 to 10 parts by mass relative to 100 parts by mass of the composite particle. The binder may include any component. The binder may include, for example, at least one selected from the group consisting of a rubber-based binder and a fluorine-based binder.

The rubber-based binder may include, for example, at least one selected from the group consisting of butadiene rubber (BR), hydrogenated butadiene rubber, styrene-butadiene rubber (SBR), hydrogenated styrene-butadiene rubber, nitrile-butadiene rubber (NBR), hydrogenated nitrile-butadiene rubber, and ethylene-propylene rubber (EPM).

The fluorine-based binder may include, for example, at least one selected from the group consisting of polyvinylidene difluoride (PVDF), vinylidene difluoride-hexafluoropropylene copolymer (PVDF-HFP), and polytetrafluoroethylene (PTFE). The binder may include polymer blends, polymer alloys, copolymers, and/or the like of the materials mentioned above.

A binder that includes an SBR-derived component is also called "an SBR-based binder". For example, the SBR-based binder may include an SBR-derived component in an amount of 10% or more, or may include an SBR-derived component in an amount of 30% or more, or may include an SBR-derived component in an amount of 50% or more, or may include an SBR-derived component in an amount of 70% or more, or may include an SBR-derived component in an amount of 90% or more, in terms of mass fraction. The SBR-based binder may consist of SBR.

The binder may include a thermoplastic resin. For example, when an active material layer that includes a thermoplastic resin is subjected to hot pressing, the thermoplastic resin may become liquid and then return to solid. As a result, the active material layer is expected to become dense. With the active material layer becoming dense, battery properties (such as input-output properties, for example) are expected to be enhanced. The thermoplastic resin may include SBR, for example. SBR may have a softening point suitable for hot pressing.

The affinity between various materials may be evaluated by the distance in the Hansen space (Ra). "Hansen space" is a three-dimensional space that is expressed by Hansen solubility parameters (HSP). The smaller the distance (Ra) between two materials in the Hansen space is, the higher the affinity between these two materials is expected to be. For example, the distance between the sulfide SE and the imidazoline-based compound ($Ra^1$) may be smaller than the distance between the sulfide SE and the binder ($Ra^2$). That is, the relationship of "$Ra^1/Ra^2<1$" may be satisfied. When "$Ra^1/Ra^2<1$" is satisfied, the dispersion effect is expected to be enhanced. When the imidazoline-based compound can preferentially adsorb on the sulfide SE as compared to the binder is, dispersion effect is expected to be enhanced. For example, the relationship of "$Ra^2-Ra^1\geq 0.5\ MPa^{0.5}$" may be satisfied. The rubber-based binder tends to have a large distance ($Ra^2$) as compared to the fluorine-based binder. That is, the affinity of the rubber-based binder for the sulfide SE tends to be less than that of the fluorine-based binder. When the active material layer includes a rubber-based binder, the dispersion effect of the imidazoline-based compound is likely to be obtained.

In the following, calculation examples of the distance in the Hansen space are given.

Distance between sulfide SE and imidazoline-based compound ($Ra^1$)=10.7 $MPa^{0.5}$ Distance between sulfide SE and rubber-based binder ($Ra^2$)=11.6 $MPa^{0.5}$ Distance between sulfide SE and fluorine-based binder ($Ra^2$)=3.8 $MPa^{0.5}$ <Method of Producing Electrode>

Figure 2:
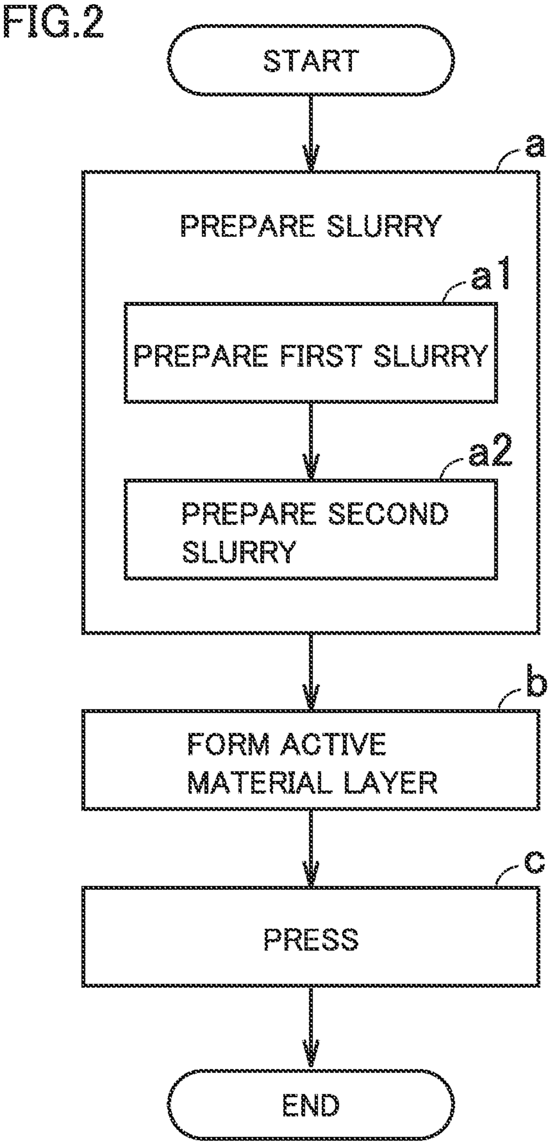
FIG. 2 is a schematic flowchart for a method of producing an electrode according to the present embodiment.

FIG. 2 is a schematic flowchart for a method of producing an electrode according to the present embodiment.

The method of producing an electrode according to the present embodiment (which may also be simply called "the present production method" hereinafter) includes "(a) preparing a slurry" and "(b) forming an active material layer". The present production method may further include "(c) pressing", and the like, for example.

<<(a) Preparing Slurry>>

The present production method includes preparing a slurry that includes a composite particle, an imidazoline-based compound, and a dispersion medium. The slurry may further include an auxiliary material (such as a binder). For example, the composite particle, the imidazoline-based compound, and the auxiliary material may be dispersed into the dispersion medium to form the slurry. In the present production method, any mixing apparatus, any mixing/kneading apparatus, any dispersing apparatus, and/or the like may be used. For example, an ultrasonic homogenizer and/or the like may be used.

The materials may be added at once, or may be added sequentially. When the materials are added sequentially, dispersion processing may be carried out every time the material is added. When the materials are added sequentially, the imidazoline-based compound may be added before the composite particle is added. That is, the present production method may include "(a1) preparing a first slurry" and "(a2) preparing a second slurry". The first slurry is prepared so that it includes the imidazoline-based compound and the dispersion medium. The second slurry is prepared by dispersing the composite particle into the first slurry. When the composite particle is added after the imidazoline-based compound is dispersed, the dispersion effect is expected to be enhanced. The auxiliary material may be mixed in the first slurry, or may be mixed in the second slurry.

The solid content of the slurry may be optionally adjusted depending on the application mode and/or the like, for example. The solid content of the slurry may be from 50 to 70%, for example.

The details of the components in the slurry except the dispersion medium are as described above. The dispersion medium may include any component. The dispersion medium may include, for example, at least one selected from the group consisting of aromatic hydrocarbons, esters, alcohols, ketones, and lactams. The dispersion medium may include, for example, at least one selected from the group consisting of tetralin, butyl butyrate, heptane, and N-methyl-2-pyrrolidone (NMP).

Butyl butyrate is expected to be less likely to degrade the sulfide SE, as compared to NMP and the like, for example. Tetralin is expected to be less likely to degrade the sulfide SE, as compared to butyl butyrate, NMP, and the like, for example. When the dispersion medium includes tetralin, initial resistance is expected to be decreased, for example.

<<(b) Forming Active Material Layer>>

The present production method includes forming an active material layer by application of the slurry. For example, the slurry may be applied to the surface of a base material and dried, to form an active material layer. The details of the base material are as described above. In the present production method, any application apparatus may be used. For example, a die coater, a roll coater, and/or the like may be used. In the present production method, any drying apparatus may be used. For example, a hot-air drying apparatus, a hot plate, an infrared drying apparatus, and/or the like may be used.

<<(c) Pressing>>

The present production method may include subjecting the active material layer to press work, for example. Cold pressing may be carried out, or hot pressing may be carried out, for example. In the present production method, any pressing apparatus may be used. For example, a roll-press apparatus and/or the like may be used. In the case of hot pressing, the pressing temperature may be adjusted depending on the type of the binder and/or the like, for example. The pressing temperature may be from 80 to 180° C., for example.

In the above-described manner, an electrode may be produced. The electrode may be cut into a certain size depending on the specifications of the all-solid-state battery.

<All-Solid-State Battery>

Figure 3:
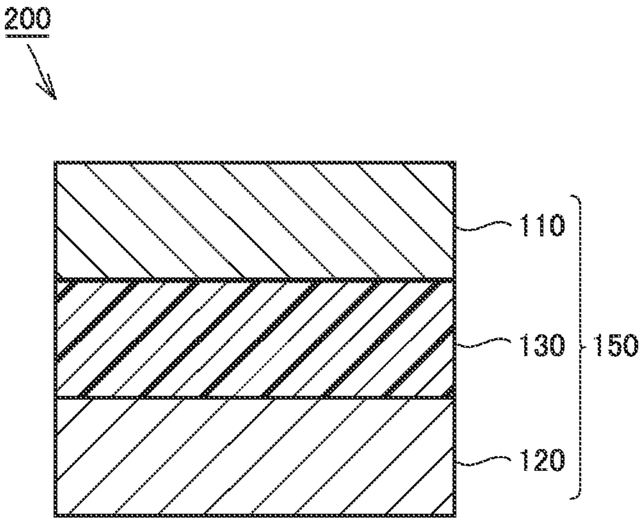
FIG. 3 is a conceptual view of an all-solid-state battery according to the present embodiment.

FIG. 3 is a conceptual view of an all-solid-state battery according to the present embodiment.

An all-solid-state battery 200 includes a power generation element 150. All-solid-state battery 200 may include an exterior package (not illustrated), for example. The exterior package may accommodate power generation element 150. The exterior package may have any configuration. For example, the exterior package may be a pouch made of metal foil laminated film, and/or the like, or may be a metal case and/or the like.

All-solid-state battery 200 may include a single power generation element 150, or may include a plurality of power generation elements 150. The plurality of power generation elements 150 may form a series circuit, or may form a parallel circuit, for example.

Power generation element 150 includes a positive electrode 110, a separator layer 130, and a negative electrode 120. That is, all-solid-state battery 200 includes an electrode. At least one of positive electrode 110 and negative electrode 120 includes the composite particle and the imidazoline-based compound.

Separator layer 130 may have a thickness from 1 to 100 μm, for example. Separator layer 130 is interposed between positive electrode 110 and negative electrode 120. Separator layer 130 separates positive electrode 110 from negative electrode 120. Separator layer 130 has ion-conductive properties but does not have electron-conductive properties. Separator layer 130 includes an ion-conducting material. Separator layer 130 may include a sulfide SE and/or the like, for example. Separator layer 130 may further include a fluoride SE, a binder, and the like, for example. The details of these materials are as described above. Separator layer 130 and positive electrode 110 may include the same type of, or different types of, sulfide SE. Separator layer 130 and negative electrode 120 may include the same type of, or different types of, sulfide SE.

All-solid-state battery 200 may include a restraint member (not illustrated). The restraint member applies pressure to power generation element 150 from the outside of the exterior package. The pressure applied to power generation element 150 is also called "restraining pressure". The restraining pressure may be from 0.1 to 50 MPa, or from 1 to 20 MPa, for example. The structure of the restraint member is not particularly limited. The restraint member may include two end plates, a bolt, a nut, and the like, for example. These two end plates may be used for holding power generation element 150 therebetween. The bolt may be used for connecting the two end plates together. The nut may be used for fastening the bolt.

[Examples]

<Producing Sample>

In the manner described below, electrodes and all-solid-state batteries according to Nos. 1 to 4 were produced. Hereinafter, "the electrode according to No. 1" and/or the like is also simply called "No. 1", for example.

<<No. 1>>

(Producing Negative Electrode Slurry)

The below materials were prepared.

Active material: $Li_4Ti_5O_{12}$

Coating material additive: "DISPERBYK (registered trademark)-109" manufactured by BYK-Chemie Ion-conducting material: $10LiI-15LiBr-75Li_3PS_4$ (D50=0.9 μm)

Electron-conducting material: VGCF

Binder: SBR-based binder

Dispersion medium: tetralin

The coating material additive included an imidazoline-based compound (1-hydroxyethyl-2-alkenylimidazoline).

The active material, the coating material additive, the ion-conducting material, the electron-conducting material, the binder, and the dispersion medium were mixed together with the use of an ultrasonic homogenizer ("UH-50" manufactured by SMT) to prepare a slurry. The solid matter blending ratio was "(active material)/(coating material additive)/(ion-conducting material)/(electron-conducting material)/binder=100/1.88/33.6/1.1/0.86 (mass ratio)". The solid content of the slurry was 56%.

(Producing Positive Electrode Slurry)

The below materials were prepared.

Composite particle: "core particle" ($LiNi_{0.8}Co_{0.15}Al_{0.05}O_2$)/"first layer" ($Li_{2.7}Ti_{0.3}Al_{0.7}F_6$)/"second layer" ($Li_3PS_4$)

Coating material additive: "DISPERBYK (registered trademark)-109" manufactured by BYK-Chemie Ion-conducting material: $10LiI\text{-}15LiBr\text{-}75Li_3PS_4$ (D50=0.9 μm)

Electron-conducting material: VGCF, AB

Binder: SBR-based binder

Dispersion medium: tetralin

The composite particle, the coating material additive, the ion-conducting material, the electron-conducting material, the binder, and the dispersion medium were mixed together with the use of an ultrasonic homogenizer to prepare a slurry. The solid matter blending ratio was "(composite particle)/(coating material additive)/(ion-conducting material)/VGCF/AB/binder=100/0.05/32.0/3.06/0.3/0.42 (mass ratio)". The solid content of the slurry was 65.5%.

Specific mixing procedure was as follows.

Into a vessel, the binder, the electron-conducting material (AB), and the dispersion medium were added. The resulting mixture was subjected to dispersion processing with the use of an ultrasonic homogenizer. Then, the composite particle was added to the vessel, followed by another round of dispersion processing. Then, the coating material additive (imidazoline-based compound) was added to the vessel, followed by another round of dispersion processing. Lastly, the ion-conducting material (sulfide SE) and the electron-conducting material (VGCF) were added, followed by another round of dispersion processing.

That is, during the production process of the slurry according to No. 1, the composite particle was added before the imidazoline-based compound. In Table 1 below, the order for adding materials in No. 1 is specified as "Composite particle→Imidazoline-based compound".

(Producing Separator Slurry)

The below materials were prepared.

Ion-conducting material: $LiI—LiBr—Li_2S—P_2S_5$ (glass ceramic type, D50=2.5 μm)

Binder solution: SBR-based binder (mass fraction, 5%) as solute, heptane as solvent Dispersion medium: heptane In a vessel made of polypropylene, with the use of an ultrasonic homogenizer, the ion-conducting material, the binder solution, and the dispersion medium were mixed together for 30 seconds. After mixing, the vessel was set into a shaker. The vessel was shaken by the shaker for 3 minutes to prepare a slurry.

(Producing Power Generation Element)

With the use of a blade applicator, the positive electrode slurry was applied to the surface of a base material (an Al foil with a thickness of 15 μm). After application, the slurry was dried on a hot plate (the temperature set at 100° C.) for 30 minutes to form an active material layer. That is, a positive electrode that included the active material layer and the base material was formed.

With the use of a blade applicator, the negative electrode slurry was applied to the surface of a base material (a Ni foil with a thickness of 22 μm). After application, the slurry was dried on a hot plate (the temperature set at 100° C.) for 30 minutes to form an active material layer. That is, a negative electrode that included the active material layer and the base material was formed. The coating weight for the negative electrode was adjusted so that the ratio of the charged specific capacity of the negative electrode to the charged specific capacity of the positive electrode became 1.0. The charged specific capacity of the positive electrode was 200 mAh/g.

The positive electrode was subjected to press work. After the press work, with the use of a die coater, the separator slurry was applied to the surface of the positive electrode. After application, the slurry was dried on a hot plate (the temperature set at 100° C.) for 30 minutes to form a separator layer. In this way, a first unit was prepared. The resulting first unit was subjected to press work with the use of a roll-press apparatus. The linear pressure was 2 ton/cm.

The negative electrode was subjected to press work. After the press work, with the use of a die coater, the separator slurry was applied to the surface of the negative electrode. After application, the slurry was dried on a hot plate (the temperature set at 100° C.) for 30 minutes to form a separator layer. In this way, a second unit was prepared. The resulting second unit was subjected to press work with the use of a roll-press apparatus. The linear pressure was 2 ton/cm.

The separator slurry was applied to the surface of a temporary support (metal foil). After application, the slurry was dried on a hot plate (the temperature set at 100° C.) for 30 minutes to form a separator layer.

The separator layer was transferred from the temporary support onto the surface of the first unit. By die-cutting, the planar profile of the first unit and the second unit was adjusted. The first unit and the second unit were stacked together so that the separator layer of the first unit faced the separator layer of the second unit. In this manner, a power generation element was formed. The resulting power generation element was subjected to hot pressing with the use of a roll-press apparatus. The pressing temperature was 160° C. The linear pressure was 2 ton/cm.

(Producing All-Solid-State Battery)

An exterior package (a pouch made of Al-laminated film) was prepared. The power generation element was sealed into the exterior package. A restraint member was prepared. The restraint member was attached to the outside of the exterior package in such a manner that a restraining pressure of 5 MPa was to be generated. In this way, an all-solid-state battery was produced.

<<No. 2>>

The mixing procedure described in "Producing Positive Electrode Slurry" was changed as follows, and a positive electrode slurry was prepared.

Into a vessel, the binder, AB, and the dispersion medium were added. The resulting mixture was subjected to dispersion processing with the use of an ultrasonic homogenizer. Then, the ion-conducting material and VGCF were added, followed by another round of dispersion processing. Then, the coating material additive was added into the vessel, followed by another round of dispersion processing. Lastly, the composite particle was add into the vessel, followed by another round of dispersion processing.

That is, during the production process of the slurry according to No. 2, the composite particle was added after the imidazoline-based compound was added. In Table 1 below, the order for adding materials in No. 2 is specified as "Imidazoline-based compound→Composite particle". Except for these, in the same manner as in No. 1, an electrode and an all-solid-state battery were produced.

<<No. 3>>

An electrode and an all-solid-state battery were produced in the same manner as in No. 2 except that the amount of the coating material additive to be used described in "Producing Positive Electrode Slurry" was changed to 0.1 parts by mass relative to 100 parts by mass of the composite particle.

<<No. 4>>

An electrode and an all-solid-state battery were produced in the same manner as in No. 1 except that the coating material additive as described in "Producing Positive Electrode Slurry" was not used.

<Evaluation>

SOC (State Of Charge) of the all-solid-state battery was adjusted to 50%. Within a thermostatic chamber (the temperature set at 25° C.), at an hour rate of 60.2 C, the all-solid-state battery was discharged for 2 seconds. From the amount of voltage drop during discharging as well as the current, initial resistance was determined.

"C" is a symbol denoting the hour rate (rate) of current. At an hour rate of 1 C, the rated capacity of a battery is discharged in 1 hour.

After the initial resistance was measured, endurance testing was carried out. More specifically, pulse cycles of charge and discharge were carried out under the conditions described below.

Testing temperature: 80° C.

SOC range: 50 to 60%

Number of cycles of charge and discharge: 800

After the endurance testing, post-endurance resistance was measured in the same manner as for the initial resistance. The post-endurance resistance was divided by the initial resistance to determine the resistance increment.

TABLE 1

| No. | Method of producing electrode<br>Slurry<br>Order for adding materials<br>— | Electrode<br>Active material layer<br>Imidazoline-based compound<br>[parts by mass] | All-solid-state battery<br>Resistance increment<br>[%] |
|---|---|---|---|
| 1 | Composite particle<br>→ Imidazoline-based compound | 0.05 | 117 |
| 2 | Imidazoline-based compound<br>→ Composite particle | 0.05 | 116 |
| 3 | Imidazoline-based compound<br>→ Composite particle | 0.1 | 114 |
| 4 | — | 0 | 119 |

As seen in Table 1 above, Nos. 1 to 3 had low resistance increment as compared to No. 4. The active material layer according to Nos. 1 to 3 includes an imidazoline-based compound. The active material layer according to No. 4 does not include an imidazoline-based compound.

No. 2 had low resistance increment as compared to No. 1. In the production process of the slurry according to No. 2, the imidazoline-based compound was added before the composite particle.

No. 3 had low resistance increment as compared to No. 2. The amount of the imidazoline-based compound to be used in No. 3 is higher than in No. 2.

What is claimed is:

1. An electrode comprising:

an active material layer, wherein the active material layer includes a composite particle and an imidazoline-based compound, the composite particle includes a core particle and a covering layer, the covering layer covers at least part of a surface of the core particle, the core particle includes an active material, the covering layer includes a first layer and a second layer, at least part of the first layer is interposed between the core particle and the second layer, the first layer includes a first solid electrolyte, the second layer includes a second solid electrolyte, the first solid electrolyte is a fluoride, and the second solid electrolyte is a sulfide.

2. The electrode according to claim 1, wherein the imidazoline-based compound is represented by a formula (1):

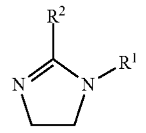

(1)

where $R^1$ is an alkyl group or a hydroxyalkyl group and has 1 to 22 carbon atoms, and $R^2$ is an alkyl group or an alkenyl group and has 10 to 22 carbon atoms.

3. The electrode according to claim 1, wherein the imidazoline-based compound is from 0.05 to 0.1 parts by mass relative to 100 parts by mass of the composite particle.

4. The electrode according to claim 1, wherein the first solid electrolyte is represented by a formula (2):

$$Li_{6-nx}M_xF_6 \quad (2)$$

where x satisfies $0<x<2$,

M is at least one selected from the group consisting of semimetal atoms and metal atoms except Li, and, n represents an oxidation number of M.

5. The electrode according to claim 4, wherein M in the formula (2) includes an atom whose oxidation number is +4.

6. The electrode according to claim 4, wherein M in the formula (2) includes an atom whose oxidation number is +3.

7. The electrode according to claim 4, wherein M in the formula (2) includes at least one selected from the group consisting of Ca, Mg, Al, Y, Ti, and Zr.

8. An all-solid-state battery comprising the electrode according to claim 1.

9. A method of producing an electrode, the method comprising:

(a) preparing a slurry that includes a composite particle, an imidazoline-based compound, and a dispersion medium; and (b) forming an active material layer by application of the slurry, where the composite particle includes a core particle and a covering layer, the covering layer covers at least part of a surface of the core particle, the core particle includes an active material, the covering layer includes a first layer and a second layer, at least part of the first layer is interposed between the core particle and the second layer, the first layer includes a first solid electrolyte, the second layer includes a second solid electrolyte, the first solid electrolyte is a fluoride, and the second solid electrolyte is a sulfide.

10. The method of producing an electrode according to claim 9, wherein the (a) includes:

(a1) preparing a first slurry that includes the imidazoline-based compound and the dispersion medium; and (a2) preparing a second slurry by dispersing the composite particle into the first slurry.

* * * * *